United States Patent
Deflumere et al.

(10) Patent No.: US 6,836,320 B2
(45) Date of Patent: Dec. 28, 2004

(54) METHOD AND APPARATUS FOR ACTIVE BORESIGHT CORRECTION

(75) Inventors: Michael E. Deflumere, Winchester, MA (US); Hamilton Stewart, Hollis, NH (US)

(73) Assignee: AE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/607,155

(22) Filed: Jun. 25, 2003

(65) Prior Publication Data

US 2004/0233420 A1 Nov. 25, 2004

Related U.S. Application Data

(60) Provisional application No. 60/420,873, filed on Oct. 23, 2002.

(51) Int. Cl.[7] ................................................ G01C 3/08
(52) U.S. Cl. ................ 356/141.1; 356/4.01; 356/141.3; 250/342
(58) Field of Search ............................. 356/4.01, 5.15, 356/141.1, 153, 141.3; 250/332, 342, 201.7

(56) References Cited

U.S. PATENT DOCUMENTS 5,629,767 A  *  5/1997  Tchejeyan .................. 356/153
6,020,955 A  *  2/2000  Messina ..................... 356/138
6,211,951 B1 *  4/2001  Guch, Jr. ................ 356/152.1
6,288,381 B1 *  9/2001  Messina .................. 250/201.1
6,359,681 B1 *  3/2002  Housand et al. ........... 356/4.01

* cited by examiner

Primary Examiner—Thomas H. Tarcza
Assistant Examiner—Isam Alsomiri
(74) Attorney, Agent, or Firm—Robert K. Tendler; Daniel J. Long

(57) ABSTRACT

In a dual mode target designation system involving the use of a passive IR detector for developing rough target locations and a ladar or laser range finder for refining target position, a closed loop system is provided for correcting the boresight error of the laser so that it matches that of the IR detector. In one embodiment this is accomplished by first selecting a target detected by the IR detector, executing a laser scan in which the laser beam is moved in a reach pattern until a return from the selected target is detected, developing an error vector between the reported laser target position and the reported IR detector target position and repositioning the line of sight of the laser using the error vector to minimize the co-boresighting error. The result is that the boresight correction resulting from illuminating the first target reduces laser scan time for each subsequent target to permit rapid and accurate target position acquisition. The refined target position may then used to direct a kill vehicle to the target.

32 Claims, 9 Drawing Sheets

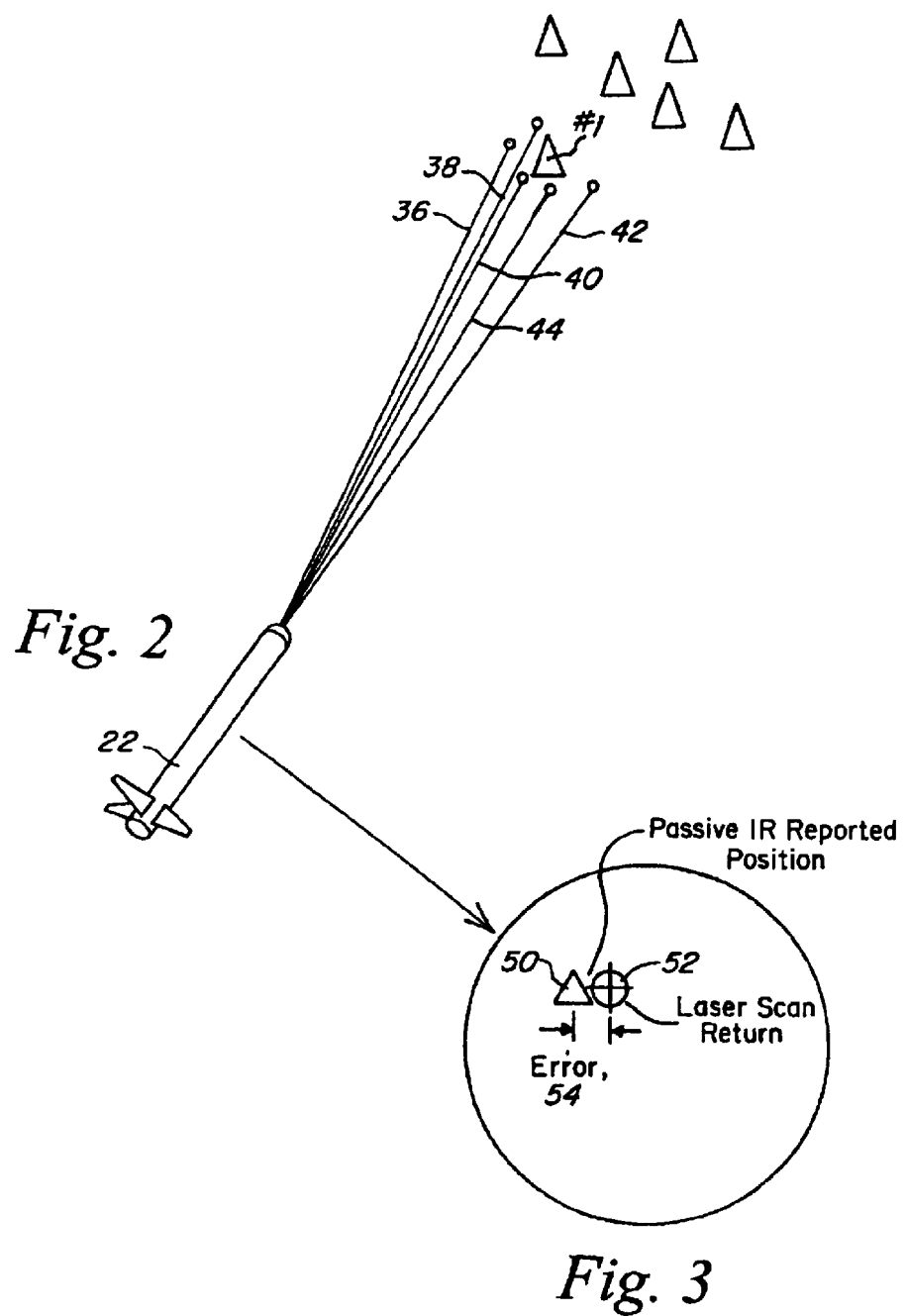

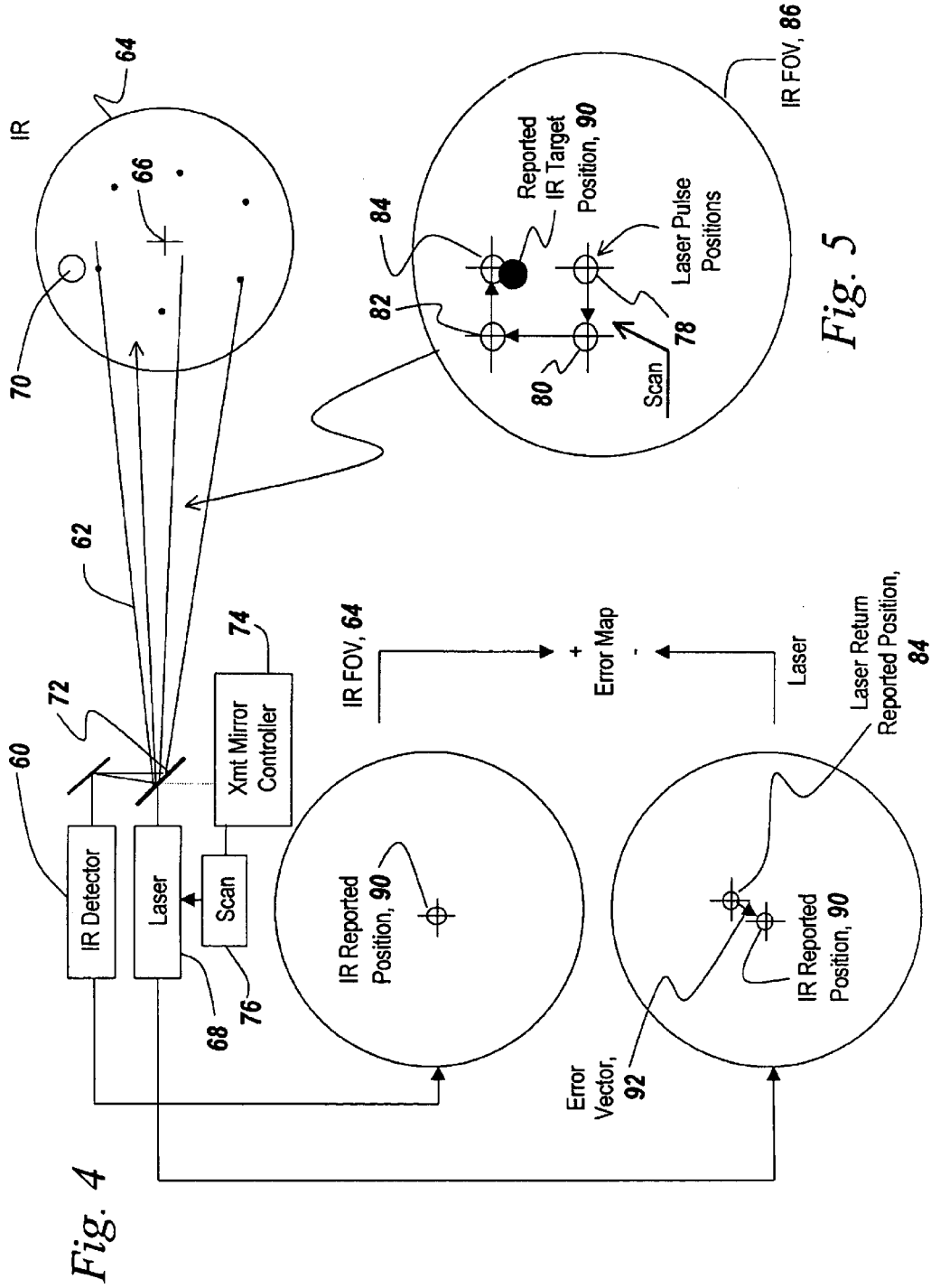

METHOD AND APPARATUS FOR ACTIVE BORESIGHT CORRECTION

CROSS REFERENCE TO RELATED APPLICATION

This application claims rights under U.S. Provisional Application Ser. No. 60/420,873, filed: Oct. 23, 2002.

FIELD OF INVENTION

This invention relates to the combined use of passive IR detectors and laser radars, ladars, or laser range finders, and more particularly to a method and apparatus for correcting boresight errors between the two systems which actively corrects boresighting errors.

BACKGROUND OF THE INVENTION

Both and a ladar and a passive IR detector have been utilized in combination in order to identify the position of incoming missiles and associated decoys so as to be able to direct kill vehicles to intercept selected ones of these targets. Typically this dual mode detection system is employed to initially provide coarse detection of the position of incoming targets and decoys within a target cloud through the use of an IR detector. This is followed by the use of an active laser system to pinpoint each of the targets so that individual kill vehicles can be launched from an intercept missile to destroy selected targets.

The course spatial position of these targets is first determined by the infrared detection system such that the targets are determined to exist with accuracy limited to the accuracies of IR systems. The reported IR position is then refined through the use of ladar techniques. When these two systems are used together they must be co-boresighted and the accuracy of the co-boresighting is critical.

The intercept missile is guided by ground based radar information to a point where the IR system can acquire the objects (typically 500 to 1000 kilometers from the intercepting missile). Assuming that the closing velocity is 10 to 14 kilometers a second, then one has between 50 and 100 seconds for the whole engagement.

While detection may occur between 500 and 1,000 kilometers, actual targeting occurs by IR and laser avionics carried on the interceptor missile when the targets are typically between 300 to 500 kilometers out. At 10 kilometers per second this portion of the engagement scenario can take no longer than 30 to 50 seconds.

The infrared detection field of view is typically on the order of, 2 degrees which at for instance 300 kilometers provides a field of view having a diameter of about 10.5 kilometers. In a battlefield scenario, an incoming vehicle may be deploying decoys such that within this 10.5 km field of view there may be as many as 200 to 300 individual targets, one being the incoming threat vehicle itself and the others being decoys.

In order to provide more exact information about target threats it is common to provide a multimode system involving not only a passive IR detector, but also an active laser system. It is therefore important that the laser be coboresighted with the IR detector so that the laser beam can be directed directly on top of a target reported by the IR detector, with the ladar range and line of sight to the threat vehicle further defining the position of a target at the time of detection of a returned laser pulse. Once having ascertained its inertial position one can launch multiple kill vehicles from the missile to destroy the target.

Note that the laser beam is an exceedingly narrow beam that for long range operation would be on the order of 20 microradians. At 500 kilometers away this beam subtends an area having a diameter of about 10 meters. If the laser boresight were perfectly aligned to the infrared detector boresight, then the laser pointing apparatus would assure that a laser beam projected along the infrared detector boresight centered on the intended target would strike the target.

However, even when the boresights are aligned and checked at the factory, there are inherently biasing errors referring to a misalignment between the IR and laser boresights which are static meaning they are always in one direction, also called bias error. There are also errors having to do with measurements, and these are random errors. The result of these two errors is that the position of a target reported by the IR detector cannot be used for laser pointing because the laser beam will be offset from the line of sight indicated by the IR detector. Thus with a very narrow laser beam it is very likely that the laser beam will miss the target if one simply fires a laser beam along the IR boresight direction. The miss is a result of an erroneous assumption that the laser boresight is perfectly aligned with the IR detector boresight.

Because of these errors, in a tactical situation the ladar beam is made to execute a search pattern such that the beam is directed in a search pattern that dances around the assumptive location of the target, the assumptive location being that which is established by the IR detector.

For each target in the target cloud, the laser beam must execute the search pattern and when there is a return from a particular target, the laser beam's direction is sufficiently exact to be used for directing one or more kill vehicles to the target.

However, if one considers 200 targets in a target cloud, and further assuming that each of the targets identified by the passive IR detector must be scanned, the overall scan time for the ladar is much too long. Thus during the 30 to 50 second engagement scenario all targets cannot be found in time.

What is therefore necessary is a real time correction system which can correct the pointing mirror for the ladar so as to eliminate bias errors and random errors. In so doing it will only take one laser probe to hit the intended target. This would eliminate time consuming scanning. One needs to correct bias and random boresight errors by using measured information as opposed to predicted information so as to minimize the scanning of the laser beam in order to actually illuminate the target identified by the infrared detector.

SUMMARY OF THE INVENTION

In order to minimize the scanning times required and thus be able to illuminate incoming targets quickly enough to assure destruction, in the subject invention an active boresight error correction system is employed in which for a first target once the scanning has identified the appropriate mirror position to direct the laser beam to the target, an offset is generated to correct the laser transmit mirror's position. Once an offset or connection factor has been generated, it is used to better aim the laser beam for the next target in the cloud. In one embodiment, the offset is used in a closed loop system so that for this first target a correcting offset is ascertained. Thus for the first target, a global offset is established which is then utilized to correct transmit mirror pointing. This offset is provided to a mapping system so that the transmit mirror is appropriately positioned to narrow the search for the next target.

The ladar then selects a second target and utilizing the global offset projects a laser pulse towards the second target. A second offset is measured because the laser beam is made to execute a search pattern, albeit smaller than the first thanks to the prior correction. The second offset further corrects the transmit mirror pointing, with the amount of searching necessary to identify the exact location of the second target significantly decreased due to the global offset employed in setting the transmit mirror. Once a return is registered from the second target, a further fine tuning offset is entered into the mirror setting database or map.

The ladar designator then searches for a third target and the process is continued. The result is a closed loop system for closing in on a target in which both biasing errors and random pointing errors are significantly reduced to reduce the scanning time spent in the search mode.

Of course it may be that across the entire IR field of view there are different errors for different quadrants or different regions. However, because of the closed loop control of the transmit mirror, errors which are detected are corrected such that the overall scan time for scanning targets by the ladar is significantly reduced.

Thus, regardless of whether or not the IR detector and laser are co-boresighted at the factory and regardless of whatever registration algorithms are utilized in the alignment process at the factory, regardless of the errors due to transport and deployment of the IR detector and ladar system and further regardless of errors induced by thermal considerations and vibration, the subject system provides an active system for reduction of boresight errors in real time.

Thus errors induced in handling of the intercept missile, storage in a silo, and then ultimately launch which might result in boresight misalignments between the IR and the laser are corrected by the subject system without the requirement for uncorrected systems in which laser beam widths need to be expanded to account for boresight errors. It will be appreciated that widening the laser beam drives up the laser power required to illuminate targets, thus impacting negatively on the range of the system.

As can be seen when an incoming missile is sensed by ground based radar and an intercept or kill vehicle is sent up to countermeasure the incoming missile one then needs to avoid boresight ambiguity or boresight errors which leads not only to ambiguities in identifying which target one is looking at, but also where to direct kill vehicles.

The subject system operates on the fact that with the IR detector one can develop a map which has a number of detected targets. One then ascertains their position by knowing where they are within the field of view of the IR detector. One then uses a registration algorithm that indicates where to find the first target and initiates a search pattern with laser beams scanned over an area where the IR detector indicates a target may be. When a reflected laser pulse is detected one therefore has the means to direct a kill vehicle to the target, while at the same time deriving an offset to correct the boresight error. Note that IR targets are reported on the focal plane of the IR device which does not give one knowledge of the position in laser space because of the aforementioned boresight errors.

In short, in the subject system once one finds out where the infrared detector says a target is going to be one then utilizes a computed correction factor to more precisely direct the laser beam to accurately establish target position. Note that there will always be some residual error involved and by going from target to target, when one utilizes the subject system one uses the actual versus predicted location from the IR focal plane to keep refining the measurement. In the subject system the refinement process proceeds very quickly with algorithms used to converge very rapidly on a solution that greatly improves the time line over uncompensated systems.

Note that while the subject invention is described in terms of a ladar which provides angle, angle range 3-D information, the subject system may be used for laser range finders which are already pointed at a known target. As such a laser range finder is a subset of ladars in which only range is detected.

In summary, in a dual mode target designation system involving the use of a passive IR detector for developing rough target locations and a ladar or laser range finder for refining target position, a closed loop system is provided for correcting the boresight error of the laser so that it matches that of the IR detector. In one embodiment this is accomplished by first selecting a target detected by the IR detector, executing a laser scan in which the laser beam is moved in a search pattern until a return from the selected target is detected, developing an error vector between the reported laser target position and the reported IR detector target position and repositioning the line of sight of the laser using the error vector to minimize the co-boresighting error. The result is that the boresight correction resulting from illuminating the first target reduces laser scan time for each subsequent target to permit rapid and accurate target position acquisition. The refined target position may then be used to direct a kill vehicle to the target.

BRIEF DESCRIPTION OF THE DRAWINGS

These and other features of the subject invention will be better understood in connection with the Detailed Description in conjunction with the Drawings, of which:

FIG. 2 is a diagrammatic illustration of the use of a ladar to more precisely require the position of various targets existing in the field of view of the passive IR detector, in which the ladar output is scanned about a target in a search pattern until a return from the particular target is detected;

FIG. 3 is a diagrammatic representation of the field of view of the IR detector showing a passive IR reported position of a target in FIG. 1 as well as an offset laser scan reported return, with a lateral error being noted;

FIG. 4 is an expanded diagram of the system of FIG. 2, in which an IR detector and a ladar laser are co-boresighted, showing the control of the transmit mirror for the laser to effectuate a laser scan in the field of view of the IR detector, with the IR field of view being utilized to establish an IR reported position and the creation of an error map between the IR reported target position and the laser reported target position after the scan of the ladar indicates painting of the target;

FIG. 5 is a diagrammatic representation of the scanning of the pulsed laser beam until such time as a return from the target is reported, with an offset noted between the reported pulse return and the IR reported position;

DETAILED DESCRIPTION

Figure 1:
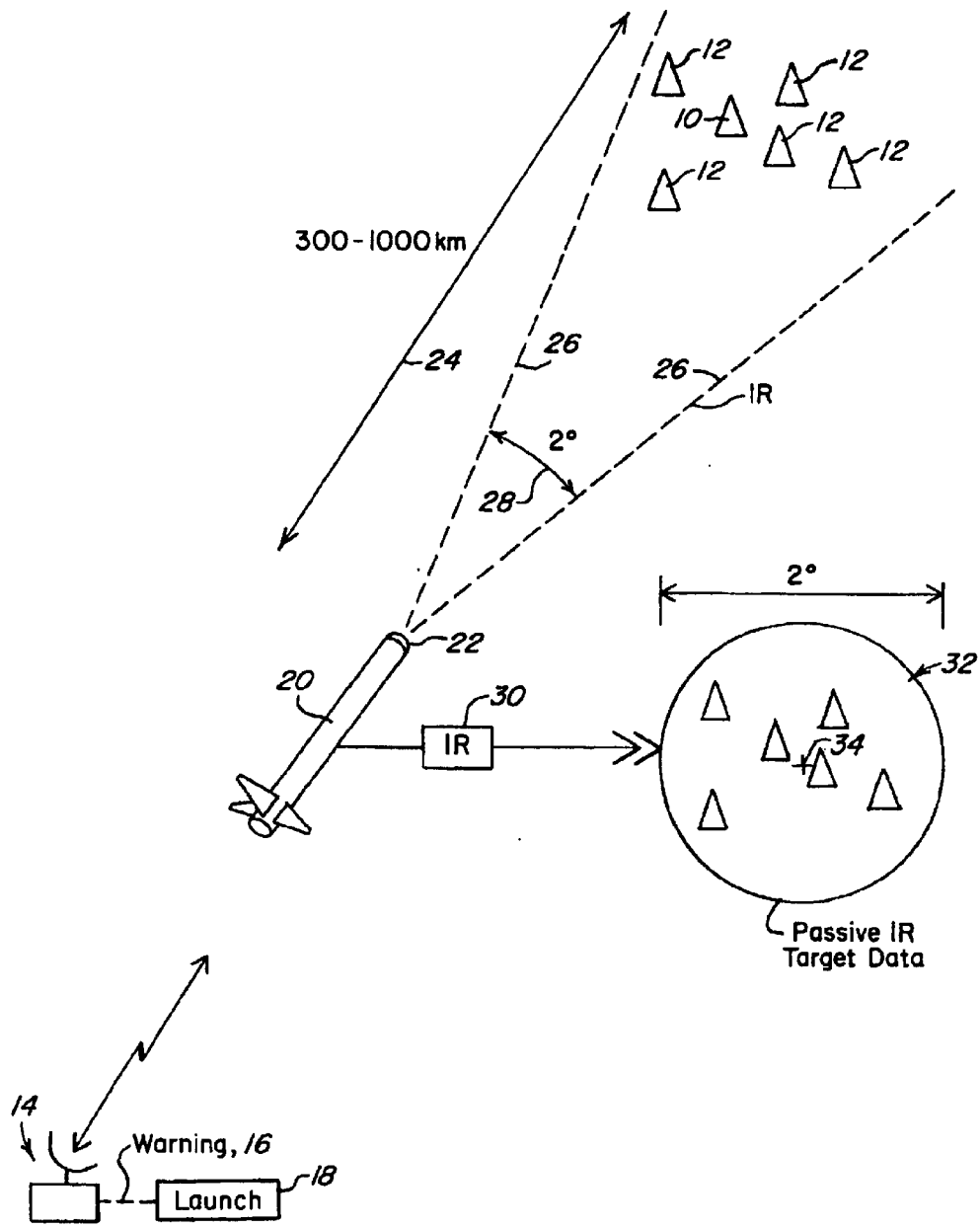
FIG. 1 is a diagrammatic representation of a battlefield scenario in which incoming targets are sensed by ground radar which causes the launch of an intercepting missile with the missile sensing the targets through the use of a wide field of view infrared detector.

Referring now to FIG. 1, in a typical scenario a target 10 and decoys 12 are detected from a ground based radar 14. Upon detection of incoming vehicles an alarm or warning 16 is utilized to dispatch the launch 18 of an intercepting missile 20 in the direction of the detected incoming threat.

An infrared detector 22 on the intercepting missile which has a wide field of view scans the direction of the incoming threat and picks up the threat vehicle and decoys as far away as 1,000 kilometers and as near as 300 kilometers as indicated by arrow 24. The beam width of the infrared detector on the missile is illustrated by dotted line 26 and in one embodiment subtends an angle of two degrees as illustrated by double ended arrow 28.

The detected IR returns at 30 are mapped onto field of view 32 and correspond to the position of the detected incoming threats at least as far as the infrared passive detector is concerned. This gives the intercepting missile, sometimes called a kill vehicle, the location of the detected threat as illustrated at 34, with the IR field of view centered on the boresight of the infrared detector.

Referring now to FIG. 2, after the threat field has been detected as illustrated in FIG. 1, a co-boresighted laser range finder or ladar is utilized to exactly determine the position of each of the targets detected by the infrared detector. In order to do this, each of the targets is scanned seriatum by outgoing pulses from the ladar such that for a target here illustrated as Number 1, a series of pulses is projected along directions 36, 38, 40, 42 and 44 until a return is detected from the illumination of the target. In this case, the target is finally found by the projection of a pulse along direction 44. It is thus the direction 44 which determines the position of the actual target.

It will be appreciated that if the laser is not co-boresighted with the optical axis of the infrared detector, then the number of scans necessary in order to obtain a return from the desired target will increase by the square of the boresight error.

The scanning time can be dramatically reduced as illustrated in FIG. 3 by actively detecting the error between the IR boresight and the laser boresight so that the laser transmit mirror can be corrected. The result is that the direction of the laser beam is more closely aligned with the line of sight of the IR detector; and scan time is dramatically reduced.

As can be seen in FIG. 3, the line of sight for the infrared detector is shown at 50 and the line of sight for the ladar or laser range finder is shown at 52. It will be seen that line of sight 50 defines the passive IR reported position, whereas line of sight 52 defines the reported laser beam position. For example, if the boresight error is two laser beam widths, then it will take up to 16 times more scanning time, e.g., four times the error squared. The result is that there is an error 54, in this case in a lateral direction between the IR boresight and the laser boresight.

By repositioning the laser transmit mirror to cancel out this error the next target to be designated will have less error between the IR boresight and the laser boresight, thus requiring fewer scans to ascertain the actual position of the second incoming target.

Referring to FIG. 4, what will be seen is that an IR detector 60 has its line of sight 62 represented on the target field 64 by line of sight 66. Laser 68 also projects energy presumably along boresight 62 so that the range and exact position of a target 70 in target cloud 64 can be ascertained. A beam combiner (dichroic filter) is employed to cause the laser and IR to share the same optical aperture. Note that this method of boresight correction will work in systems where it is desirable to have separate apertures. Once having ascertained the exact position of the target, the kill vehicle can be directed to that target.

In order direct the line of sight of the laser of the ladar unit, a transmit mirror 72 under the control of a transmit mirror controller 74 has its direction dithered through a scanning algorithm 76 such that laser pulses from laser 68 are directed to different portions of the threat cloud until such time as a return from a target is detected.

Referring to FIG. 5, the boresight of laser 68 is scanned as illustrated at 78, 80, 82 and 84, which positions are the reported laser returns on the infrared field of view 86. It is noted that the reported IR target position 90 is as illustrated, whereas the fourth scan of the laser beam from laser 68 results in a return from the actual target.

Referring back to FIG. 4, the IR field of view 64 illustrates the IR reported position 90, whereas the laser return reported position 84 is as illustrated. This results in an error vector 92 which is the difference in position between the reported IR position and the reported laser beam position when a return has been detected.

Figure 6:
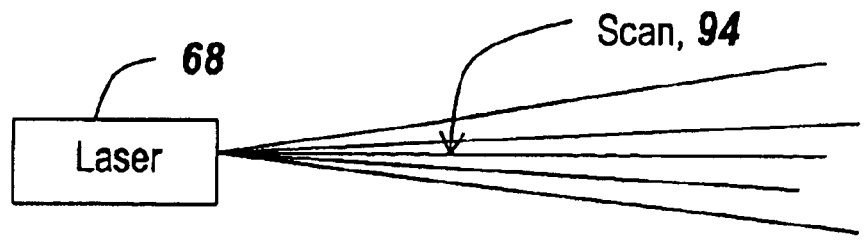
FIG. 6 is a diagrammatic illustration of the scanned output of the ladar FIG. 4.
Figure 7:
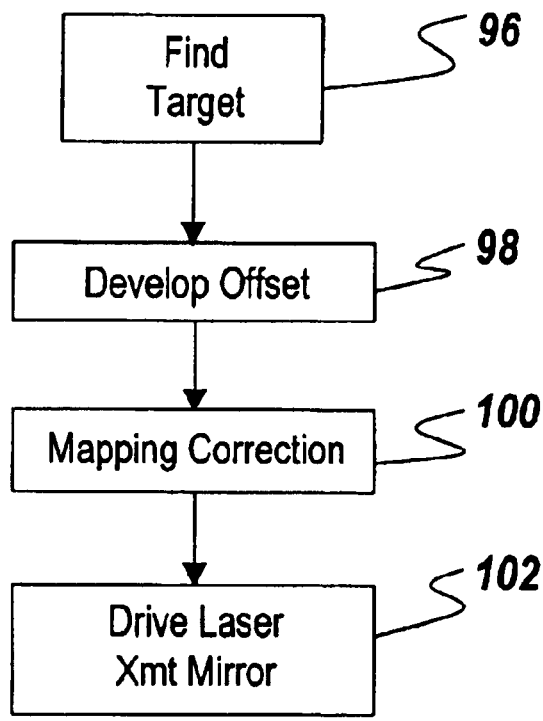
FIG. 7 is a flow chart showing an overview of the generation of the error signals to be applied to the ladar transmit mirror after the target is first found, the offset developed, and a mapping correction derived.

Referring to FIG. 6, laser 68 is scanned as illustrated at 94, with the scan being controlled as illustrated in FIG. 7.

Referring to FIG. 7, the system in FIG. 4 first finds the first target as illustrated at 96 and develops an offset as illustrated at 98 which then maps to a correction at 100 to drive the laser transmit mirror 102 so as to take into account the offset.

As mentioned before, the errors may be either bias errors or random errors and no matter how much alignment is done at the factory, vibration, temperature changes and other factors result in a misalignment between the laser boresight and the IR target position.

Figure 8:
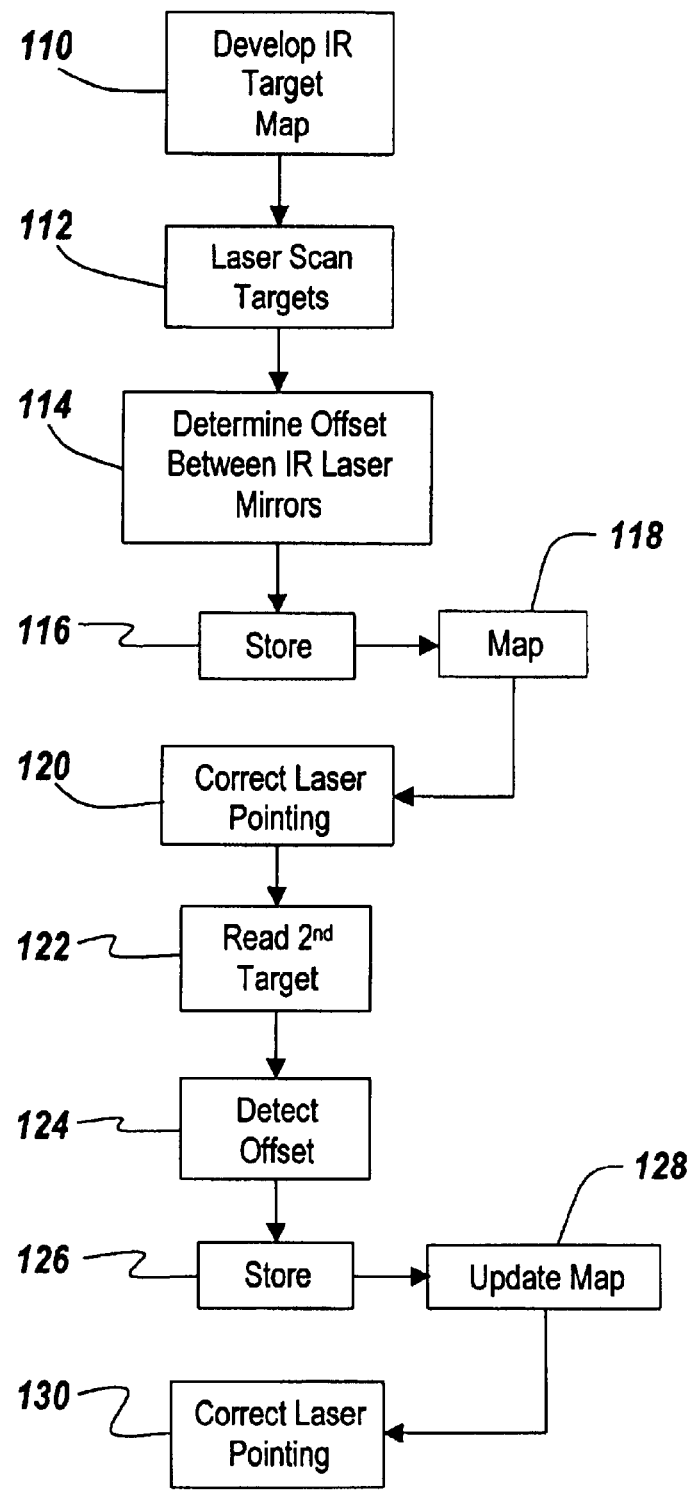
FIG. 8 is a more detailed flow chart showing the detection a particular offset, the storing of the offset, the updating of a map and the correction of laser pointing.

Referring to FIG. 8, in order to derive a correction factor for the transmit mirror, in one embodiment as illustrated at 110 one develops an IR target map. One then laser scans the targets as illustrated at 112 and determines the offset 114 between the reported laser beam position and the reported IR detected boresight.

One then stores the offset information at 116 and derives a correction map 118 which is then utilized to drive the laser transmit mirror to correct laser pointing position as illustrated at 120. One then proceeds to the second target as illustrated at 122 and laser scans it. The detected offset as illustrated at 124 is stored at 126 which is then used to update the correction map at 128, with the updated map then utilized to correct laser pointing as illustrated at 130.

What will be seen is that what is provided is a real time correction loop in which the laser pointing direction is corrected onto the boresight of the IR detector so as to eliminate both bias and random errors in the co-boresighting process.

While it might be thought that by doing the first correction for the first target all future scanning errors will be minimized due to the correction obtained therefrom, this would assume that the entire co-boresighting error is linear across the IR detector field of view. However for various reasons, either due to mechanical misalignment, properties of the pointing mirror, non-linear temperature effects, or subsequent vibration induced errors, the subject system continually updates the aforementioned maps so that the numbers of scans necessary for the some 200 targets in the threat cloud is minimized to such an extent that all targets in the threat cloud can be identified within the 20 second start-to-finish scenario that starts when the IR detector first detects an threat cloud.

Figure 9:
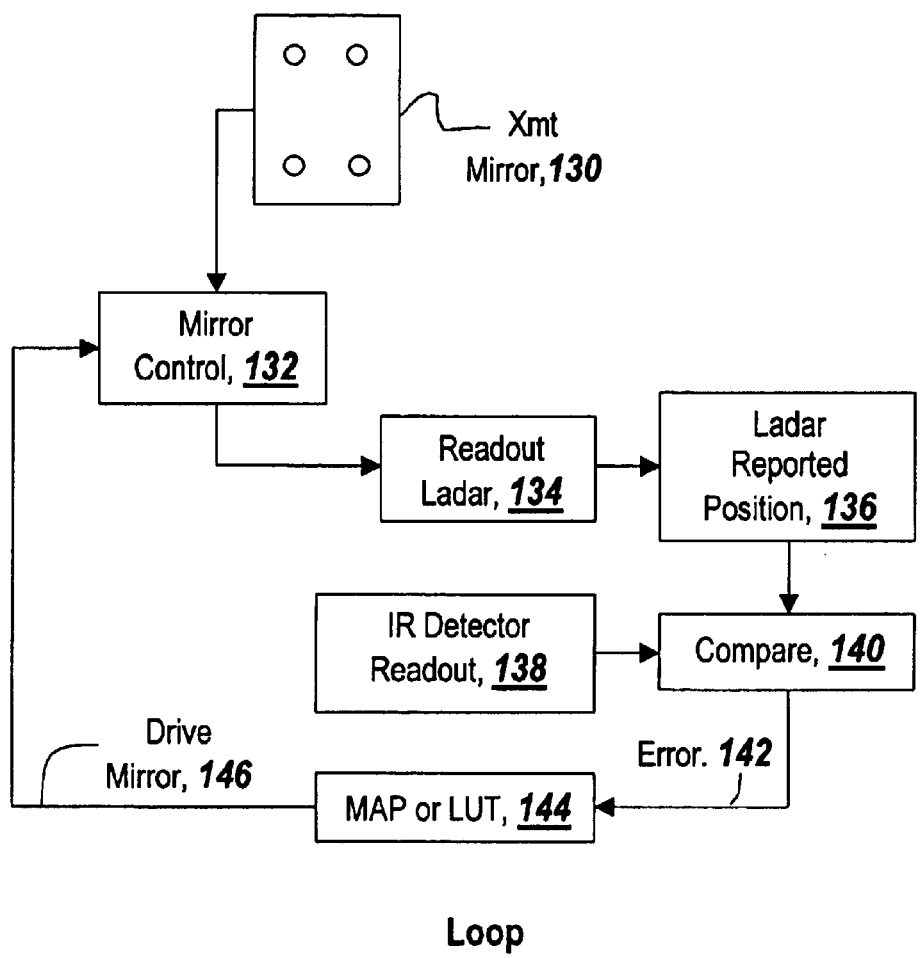
FIG. 9 is a block diagram of the control loop for the transmit mirror of the ladar of FIGS. 1 and 4 indicating the comparison step between ladar reported position and IR image reported position to provide an error signal which is instantiated in a map or lookup table, the output of which is used to drive the ladar transmit mirror.

Referring now to FIG. 9, a laser transmit mirror 130 is under the control of a mirror control unit 132 which is utilized to fine tune the position of the transmitted laser beam. At the start of each scan process the position of the transmit mirror is known or recorded by readout 134, with the ladar reported position 136 compared to the reported IR position 138 by a comparison unit 140 that develops an error signal 142 in turn coupled to a correction map or lookup table 144. The output of unit 144 is utilized as illustrated by line 146 to drive the transmit mirror in a direction to cancel the error.

It will be appreciated that rather than utilizing a lookup table or a mapping scenario, differential equations can be generated so as to correct mirror position in accordance with the detected error available on line 142.

Figure 10:
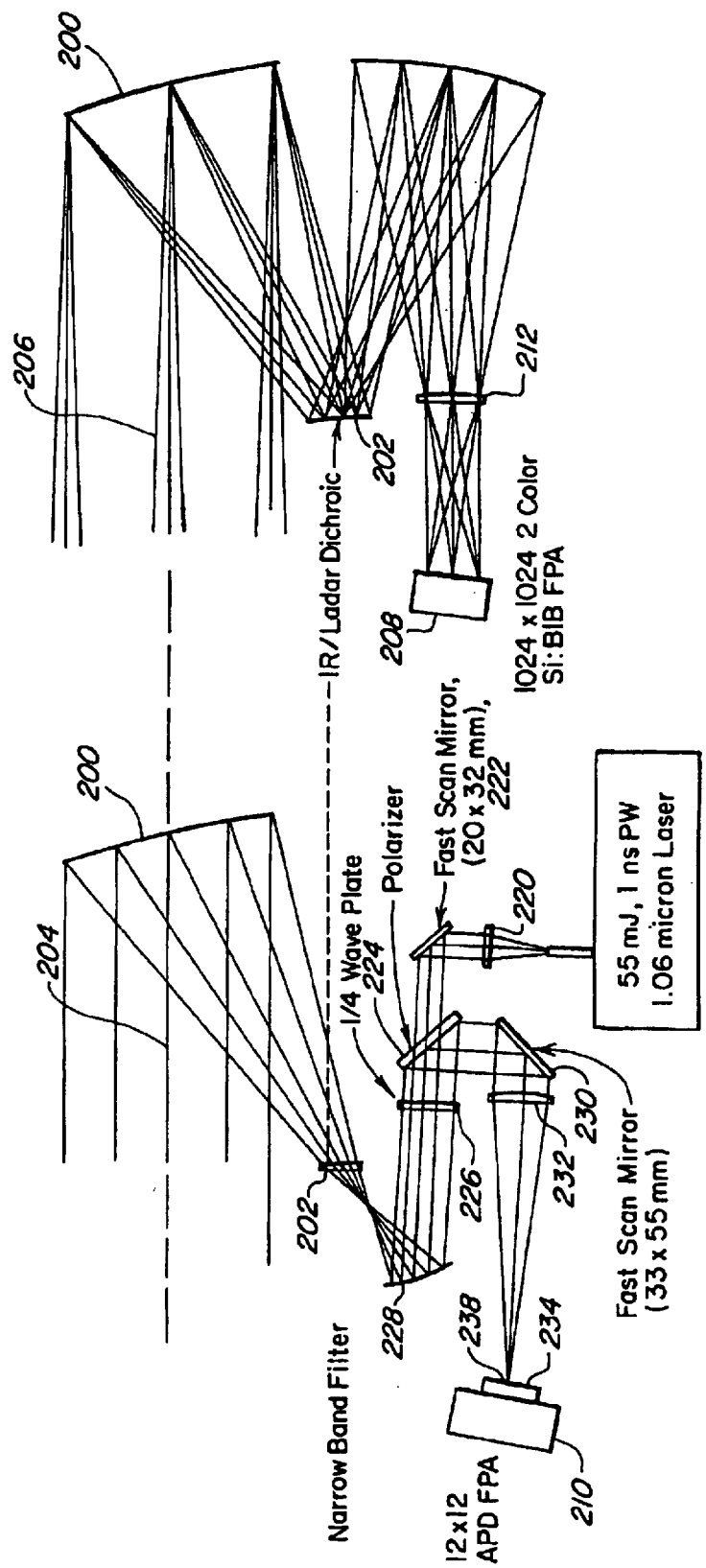
FIG. 10 is a schematic and diagrammatic representation of the boresighting problem in which a IR detector is co-located with a ladar, with the critical mirror adjustment being in the transmit mirror which controls the pointing of the laser beam from the laser used in the ladar.

In one embodiment, and referring now to FIG. 10, the two halves of the IR/laser system are illustrated. To the left of FIG. 10 is the laser range finding portion of the system, whereas to the right is the infrared portion. These two systems utilize the same collimating mirror 200 and the same IR/ladar dichroic mirror 202 which form the common elements of the two co-boresighted systems. It will be appreciated that boresight 204 is that associated with the laser and boresight 206 is that associated with the IR detector.

Each of the two halves of the system includes separate focal plane arrays, the IR focal plane array illustrated at 208 and the ladar focal plane array illustrated at 210. Optics 212 and 214 complete the optics for IR focal plane array detector 208.

As far as the ladar portion of the subject system, in one embodiment a laser 220, which may be a 55 mJ, one nanosecond pulse width, 1.06 micron laser, has its output collimated by lens 220 onto a fast scan transmit mirror 222, the output of which is passed through a polarizer 224 and a quarter wave plate 226 where the laser beam is focused by an optical element 228 through the IR/ladar dichroic mirror 202, coated so as to pass the 1.06 micron laser radiation, while reflecting infrared energy.

It will be appreciated that fast scan mirror 222 being the transmit mirror, is the critical pointing mirror for obtaining accurate co-boresighting.

Returns from a target along boresight 204 are redirected by mirror 200 through IR/ladar dichroic mirror 202 where they are focused by optics 228 back through the quarter wave plate where the return in energy is redirected by polarizer 224 towards a fast scan receive mirror 230. The returned radiation is redirected by receive mirror 230 and is passed through focusing optics 232 where it is made to impinge upon a narrow band filter 234 ahead of focal plane array 210.

It will be appreciated that the pointing accuracy of the receive mirror is not as critical as the transmit mirror because any variation will merely move the focal point 238 about the face of the focal plane array 210. There are enough pixels of focal plane array 210 that a slight misalignment of receiver mirror 230 will nonetheless result in a detection of an incoming laser pulse.

Thus the critical mirror for the co-boresighting of the infrared detector and the ladar is in fact transmit mirror 222.

Figure 11:
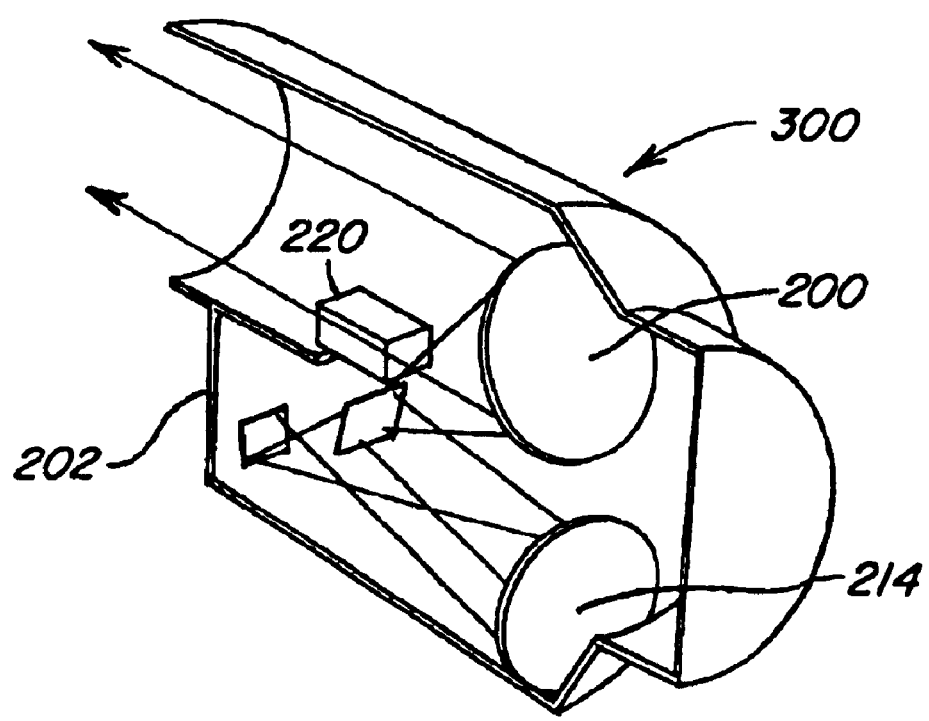
FIG. 11 is a diagrammatic representation of an IR detector/ladar pod for use on an intercept missile which may or may not be a kill vehicle; and, FIG. 12 is a block diagram of line of sight control functions.

Referring now to FIG. 11, what is depicted is a module or pod 300 which is located in the nose of an intercept missile in which the two systems are co-located and co-boresighted, with the major optical elements being as notated by the reference characters.

As can be seen both systems can be miniaturized and contained within the nose of a missile in a compact manner, with the only requirement being that the laser transmit mirror be corrected on the fly for co-boresighting misalignments.

Figure 12:
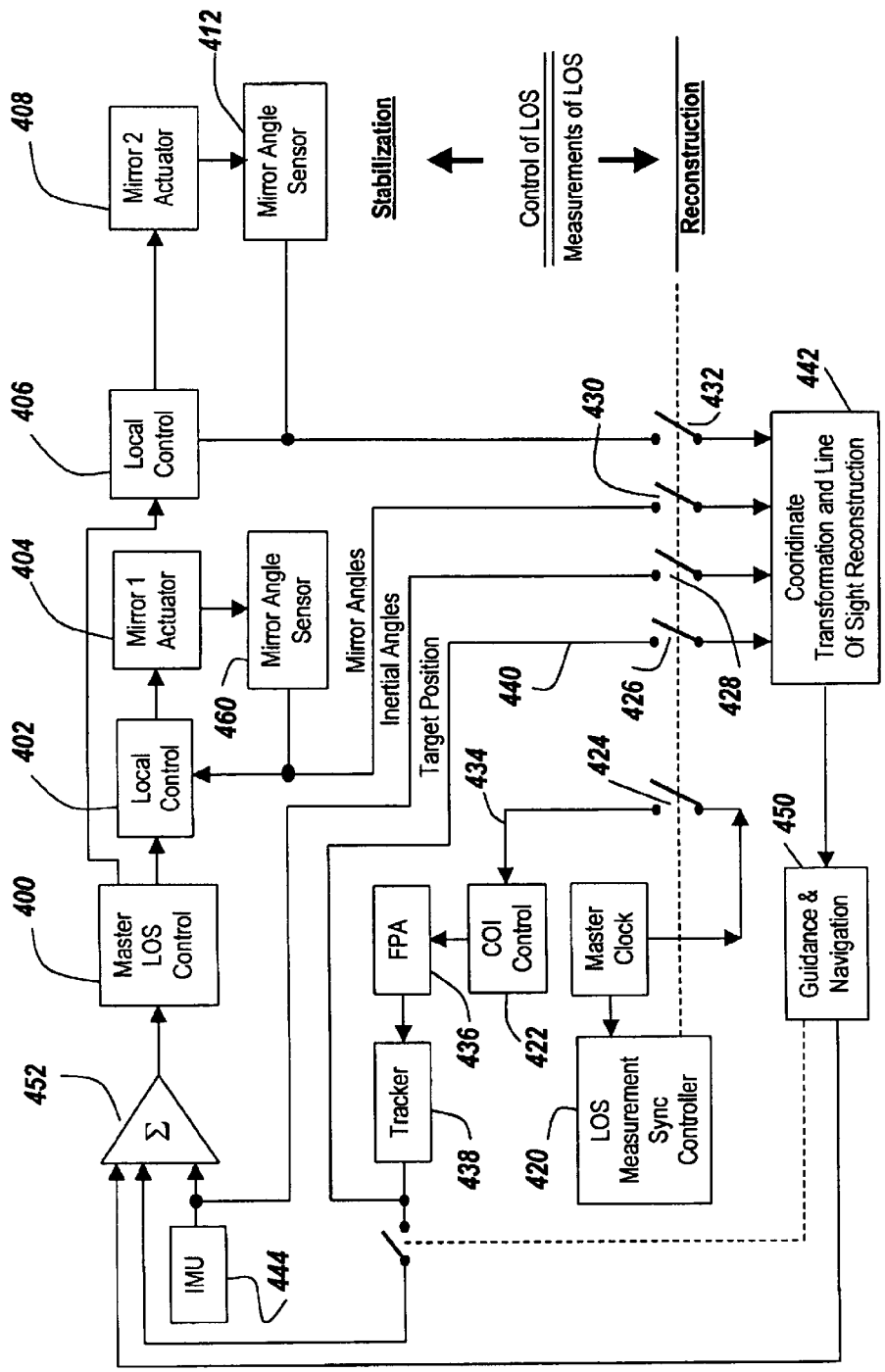

As can be seen in FIG. 12, rather than attempting to minimize line of sight induced smear of an image and rather than leveraging gimbal inertia and isolation techniques, one opts for position control of the laser beam to stabilize the line of sight pointing vector in inertial space.

Referring now to FIG. 12, a block diagram of a mirror control system is illustrated which is divided into the control of the line of sight and measurements of the line of sight, with the control of line of sight resulting in stabilization and with measurement of line of sight resulting in reconstruction. Here it can be seen that a master line of sight control unit 400 is coupled to a local control 402 of a first mirror 404 and a local control 406 of a second mirror 408. Each of the mirrors have actuators coupled to mirror angle sensors respectively 410 and 412.

Measurement of the line of sight is under the control of a line of sight measurement synchronization controller 420 coupled to a master clock 422 which during a measurement closes switches 424, 426, 428, 430 and 432. Closing of switch 424 couples the master clock to a control unit 434 coupled to a focal plane array 436 in turn coupled to a tracker 438 that tracks target position and provides it over target position line 440 to a coordinate transformation and line of sight reconstruction unit 442. This position is available to unit 442 through the closing of switch 426. Closing of switch 426 also results in inertial angles from IMU 444 to be inputted to coordinate transformation and line of sight reconstruction unit 442. Likewise, mirror angles are made available to unit 442 through the closing of switches 430 and 432.

The output of unit 442 is coupled to a guidance and navigation unit 450, with the outputs of this unit, the IMU, and the tracker being summed at 452, and with the sum coupled to master line of sight control 400.

In operation, the IR senor will acquire and track all of the objects with in its field of view. Discrimination algorithms are used to reduce this large number of objects to a manageable number of high probability of threat objects. The laser beam of the ladar system is then positioned on these objects using a complex algorithm that prioritizes the order based on threat like features. This algorithm also tries to minimize the transit time between objects and maximize the extraction of information before an object may leave the IR field of view.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a dual mode target designation system in which a narrow laser beam from a laser rangefinder having a laser is projected in a scanning fashion towards a target cloud in an attempt to illuminate a selected target in the cloud and in which an IR detector is co-boresighted with the laser of the laser range finder, a method for actively adjusting the laser boresight to align with the IR detector boresight such that at least one of the boresights is aligned with the other of the boresights, comprising the step of:

providing a closed loop system for correcting the boresight of the laser based on a comparison of the reported position of the selected target from the IR detector and the reported position of a return from the selected target as a result of illumination by the scanning laser.

2. The method of claim 1, wherein the correcting step includes adjusting the boresight of the laser by repositioning a laser transmit mirror.

3. The method of claim 2, wherein the refining step includes the step of using a mapping system for adjusting the position of the laser transmit mirror, and wherein the mapping system is updated with the results of the comparison of reported target position from the IR detector with reported target position from returns from the laser range finder.

4. The method of claim 1, wherein the laser is scanned around a target identified by the IR detector.

5. The method of claim 4, wherein the step of providing the closed loop system includes the step of detecting the target cloud with the IR detector and after a first laser return from the selected target, comparing the position of the selected target as detected by the first laser beam return with the position of the selected target as detected by the IR detector to develop an error and refining the position of the laser beam based on the error such that the closed loop correction reduces scan time in subsequent laser illuminations of the target cloud to determine the position of a second selected target in the target cloud.

6. The method of claim 1, wherein the step of providing a closed loop system for correcting the boresight of the laser includes the steps of:

determining a number of targets in the field of view of the IR detector;

selecting a first one of the number of targets in the field of view of the IR detector;

aiming the laser in the direction of the selected target;

causing the aimed laser to execute a search pattern using a transmit mirror so as to scan the area about the IR detector reported position of the first one of the number of targets;

detecting the position of the first one of the number of targets from the return of a laser pulse from the first one of the number of targets;

deriving an error signal representing the offset of the IR detector reported position and the laser range finder reported position;

repositioning the transmit mirror based on the detected offset;

selecting a second target in the field of view of the IR detector; and, aiming the laser to the second target using the transmit mirror positioned in accordance with the detected offset.

7. The method of claim 6, wherein the repositioning step includes a map for setting the position of the transmit mirror, and wherein the repositioning step includes the step of storing the detected offset as part of the map.

8. A method for minimizing scanning time in a dual mode target designator using an IR detector co-boresighted with a laser range finder that emits a laser beam so as to quickly identify the position of a target in a multiple target cloud, comprising the steps of:

deriving an error signal corresponding to boresight misalignment based on reported target position of a first target derived from the IR detector and returns from the first target illuminated by the laser beam from the laser range finder; and, for the next target selected repositioning the laser boresight so that it is more perfectly co-boresighted with the IR detector boresight, whereby scanning time for the next target is reduced due to the repositioning.

9. The method of claim 8, wherein the laser boresight direction is controlled by a laser transmit mirror.

10. The method of claim 9, wherein the repositioning step includes the step of altering the position of the transmit mirror as determined by a map and wherein the map is updated with information from the error signal so as to more accurately control the laser beam position on a subsequent scan of the transmit mirror, thus to align the laser boresight with the IR detector boresight.

11. A system for correcting the boresight of a laser range finder having a laser to match the boresight of an IR detector comprising:

a laser transmit mirror defining the boresight of the laser;

a closed loop controller coupled to said transmit mirror for adjusting the position thereof responsive to a comparison of reported IR detector position of a target with the position of the target reported by said laser range finder.

12. The system of claim 11, wherein said controller includes a mapping system for the control of said transmit mirror, said comparison resulting in an error signal coupled to said mapping system for storing the offset established by said error signal.

13. The system of claim 12, wherein said mapping system includes a lookup table.

14. A system for rapidly identifying the position of a target in a multi-target target cloud, comprising:

an IR detector for detecting the position of targets in said cloud;

a co-boresighted laser range finder for refining the position of a selected target in said target cloud once the position of said selected target has been ascertained by said IR detector;

a comparator for comparing reported position of said selected target from said IR detector with reported returns from said selected target due to illumination by said laser range finder, and for outputting an error signal corresponding to the offset in position between said reported positions;

a laser beam boresight controller coupled to said error signal for adjusting the boresight of said laser range finder to more closely correspond to the boresight of said IR detector, said boresight controller including a scanning unit for causing the laser beam of said laser range finder to repetitively scan the region of the IR detector reported position of said selected target until a return from said selected target has been detected; and, a target selector for selecting a second target, whereby the previous adjustment of the laser range finder boresight reduces the scan time associated with the scan of said laser range finder in achieving a laser return from said second target.

15. The system of claim 14, wherein said boresight controller includes a laser transmit mirror.

16. The system of claim 15, and further including mapping means for controlling the position of said transmit mirror, and wherein said offset is coupled to said mapping means for altering the information in said mapping means so as to position said transmit mirror taking said offset into account.

17. In a dual mode target designation system in which a narrow laser beam from a ladar having a laser is projected in a scanning fashion towards a target cloud in an attempt to illuminate a selected target in the cloud and in which an IR detector is co-boresighted with the laser of the ladar, a method for actively adjusting the laser boresight to align with the IR detector boresight such that at least one of the boresights is aligned with the other of the boresights, comprising the step of:

providing a closed loop system for correcting the boresight of the laser based on a comparison of the reported position of the selected target from the IR detector and the reported position of a return from the selected target as a result of illumination by the scanning laser.

18. The method of claim 17, wherein the correcting step includes adjusting the boresight of the laser by repositioning a laser transmit mirror.

19. The method of claim 18, wherein the refining step includes the step of using a mapping system for adjusting the position of the laser transmit mirror, and wherein the mapping system is updated with the results of the comparison of reported target position from the IR detector with reported target position from returns from the ladar.

20. The method of claim 17, wherein the laser is scanned around a target identified by the IR detector.

21. The method of claim 20, wherein the step of providing the closed loop system includes the step of detecting the target cloud with the IR detector and after a first laser return from the selected target, comparing the position of the selected target as detected by the first laser beam return with the position of the selected target as detected by the IR detector to develop an error and refining the position of the laser beam based on the error such that the closed loop correction reduces scan time in subsequent laser illuminations of the target cloud to determine the position of a second selected target in the target cloud.

22. The method of claim 17, wherein the step of providing a closed loop system for correcting the boresight of the laser includes the steps of:

determining a number of targets in the field of view of the IR detector;

selecting a first one of the number of targets in the field of view of the IR detector;

aiming the laser in the direction of the selected target;

causing the aimed laser to execute a search pattern using a transmit mirror so as to scan the area about the IR detector reported position of the first one of the number of targets;

detecting the position of the first one of the number of targets from the return of a laser pulse from the first one of the number of targets;

deriving an error signal representing the offset of the IR detector reported position and the ladar reported position;

repositioning the transmit mirror based on the detected offset;

selecting a second target in the field of view of the IR detector; and, aiming the laser to the second target using the transmit mirror positioned in accordance with the detected offset.

23. The method of claim 22, wherein the repositioning step includes a map for setting the position of the transmit mirror, and wherein the repositioning step includes the step of storing the detected offset as part of the map.

24. A method for minimizing scanning time in a dual mode target designator using an IR detector co-boresighted with a ladar that emits a laser beam so as to quickly identify the position of a target in a multiple target cloud, comprising the steps of:

deriving an error signal corresponding to boresight misalignment based on reported target position of a first target derived from the IR detector and returns from the first target illuminated by the laser beam from the ladar; and, for the next target selected repositioning the laser boresight so that it is more perfectly co-boresighted with the IR detector boresight, whereby scanning time for the next target is reduced due to the repositioning.

25. The method of claim 24, wherein the laser boresight direction is controlled by a laser transmit mirror.

26. The method of claim 25, wherein the repositioning step includes the step of altering the position of the transmit mirror as determined by a map and wherein the map is updated with information from the error signal so as to more accurately control the laser beam position on a subsequent scan of the transmit mirror, thus to align the laser boresight with the IR detector boresight.

27. A system for correcting the boresight of a ladar having a laser to match the boresight of an IR detector comprising:

a laser transmit mirror defining the boresight of the laser;

a closed loop controller coupled to said transmit mirror for adjusting the position thereof responsive to a comparison of reported IR detector position of a target with the position of the target reported by said ladar.

28. The system of claim 27, wherein said controller includes a mapping system for the control of said transmit mirror, said comparison resulting in an error signal coupled to said mapping system for storing the offset established by said error signal.

29. The system of claim 28, wherein said mapping system includes a lookup table.

30. A system for rapidly identifying the position of a target in a multi-target target cloud, comprising:

an IR detector for detecting the position of targets in said cloud;

a co-boresighted ladar for refining the position of a selected target in said target cloud once the position of said selected target has been ascertained by said IR detector;

a comparator for comparing reported position of said selected target from said IR detector with reported returns from said selected target due to illumination by said ladar, and for outputting an error signal corresponding to the offset in position between said reported positions;

a laser beam boresight controller coupled to said error signal for adjusting the boresight of said lader to more closely correspond to the boresight of said IR detector, said boresight controller including a scanning unit for causing the laser beam of said ladar to repetitively scan the region of the IR detector reported position of said selected target until a return from said selected target has been detected; and, a target selector for selecting a second target, whereby the previous adjustment of the lader boresight reduces the scan time associated with the scan of said ladar in achieving a laser return from said second target.

31. The system of claim 30, wherein said boresight controller includes a laser transmit mirror.

32. The system of claim 31, and further including mapping means for controlling the position of said transmit mirror, and wherein said offset is coupled to said mapping means for altering the information in said mapping means so as to position said transmit mirror taking said offset into account.

* * * * *

UNITED STATES PATENT AND TRADEMARK OFFICE
CERTIFICATE OF CORRECTION

PATENT NO. : 6,836,320 B2
DATED : December 28, 2004
INVENTOR(S) : Michael E. Deflumere and Hamilton Stewart It is certified that error appears in the above-identified patent and that said Letters Patent is hereby corrected as shown below:

<u>Title page,</u>
Item [73], Assignee, should read -- BAE Systems Information and Electronic Systems Integration Inc. --

Signed and Sealed this

Twenty-sixth Day of April, 2005

JON W. DUDAS
*Director of the United States Patent and Trademark Office*